United States Patent [19]

Abbotoy

[11] Patent Number: 4,947,577
[45] Date of Patent: Aug. 14, 1990

[54] FISHING LURE CONTAINER

[76] Inventor: Wilfred Abbotoy, 18 Ronald Dr., Lancaster, N.Y. 14086

[21] Appl. No.: 326,022

[22] Filed: Mar. 20, 1989

Related U.S. Application Data

[63] Continuation-in-part of Ser. No. 220,837, Jul. 19, 1988, Pat. No. 4,813,173.

[51] Int. Cl.⁵ .............................................. A01K 97/06
[52] U.S. Cl. ...................................................... 43/57.1
[58] Field of Search ....................... 43/54.1, 57.1, 57.2, 43/26, 4, 55; 206/315.11, 533, 485, 443, 391, 507, 515

[56] References Cited

U.S. PATENT DOCUMENTS

| | | | |
|---|---|---|---|
| 2,513,538 | 7/1950 | Williams | 43/57.1 |
| 3,596,781 | 8/1971 | Burton | 206/443 |
| 3,897,650 | 8/1975 | Pilston | 43/54.1 |
| 4,813,173 | 3/1989 | Abbotoy | 43/57.1 |
| 4,825,584 | 5/1989 | Raley | 43/57.1 |

Primary Examiner—M. Jordan
Attorney, Agent, or Firm—James J. Ralabate

[57] ABSTRACT

A foldable lure container has a series of horizontally aligned removable tubes positioned in at least two tiers. These tiers can be of any suitable length and the tubes can be any suitable diameter. This lure container when in use is unfolded and opened so that one series or alignment of tubes are positioned alternatively above the other series of tubes. When the device is to be carried from one location to another, the lower level or series of tubes is folded upward so as to be in horizontal alignment with the upper level or series. Each tube has a flip-open top or cap that permits entrance or exit of the lure housed therein. The tube is removed from the tube holder, inverted, the cap opened and the lure removed. In the preferred embodiment, the bottom of the tube has a spring-loaded hinge which when opened will allow the lure to freely drop out. It also could be a non-springloaded cap that would just snap in place either externally or internally.

14 Claims, 2 Drawing Sheets

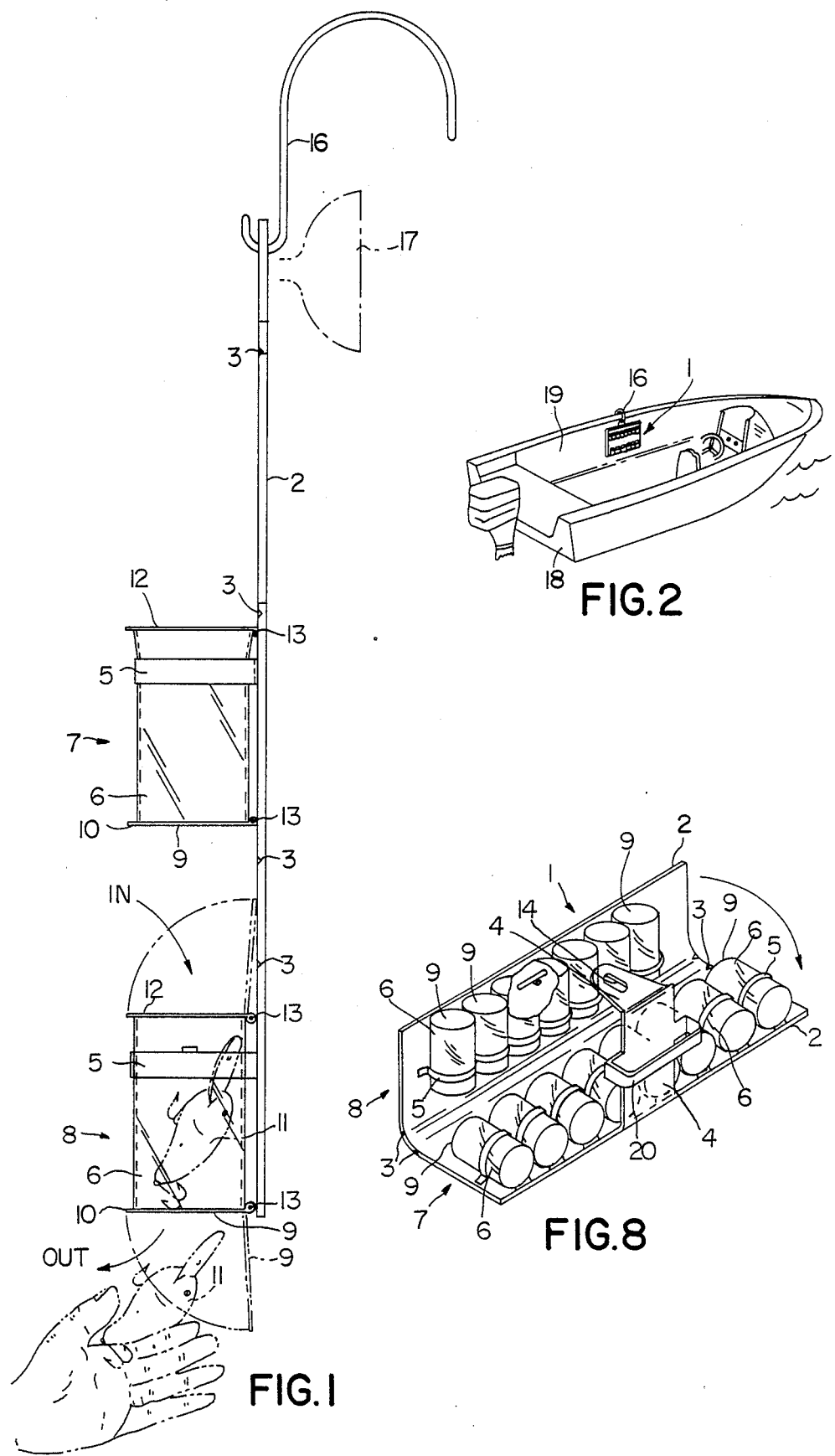

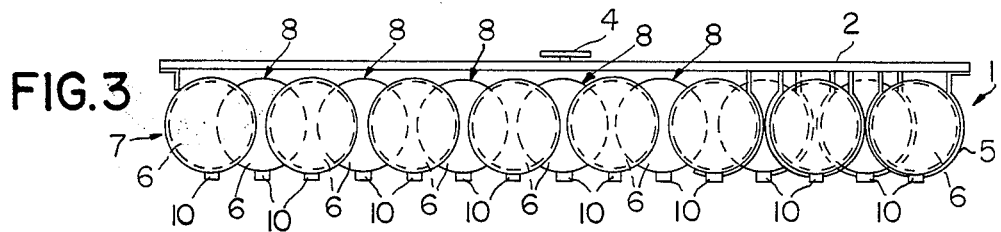
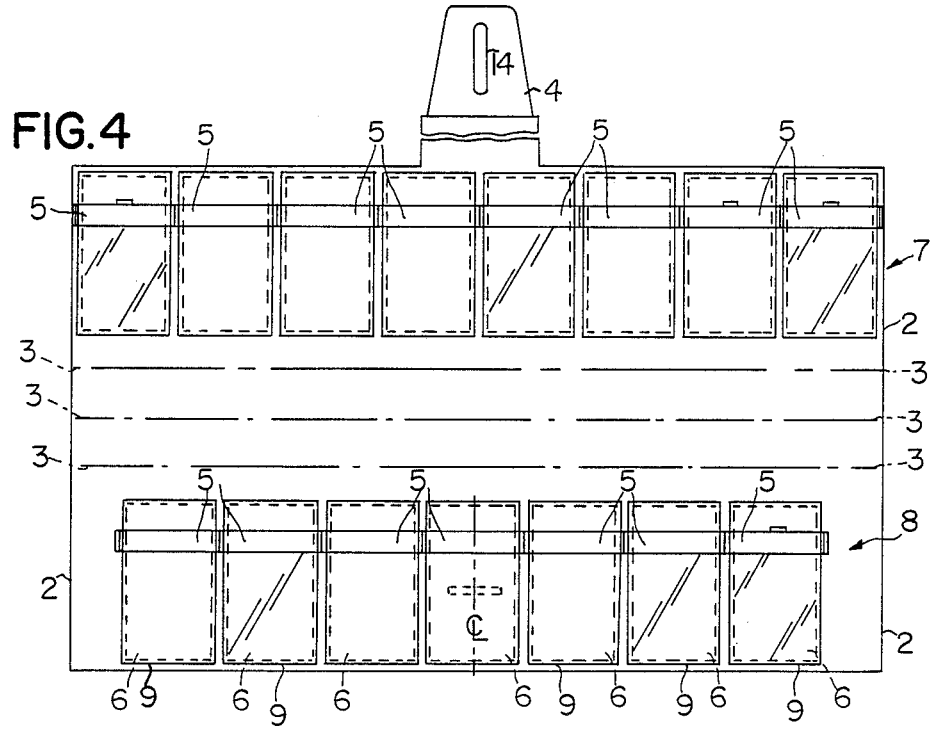
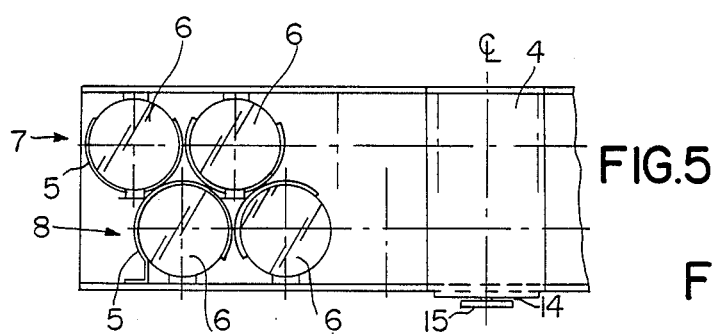
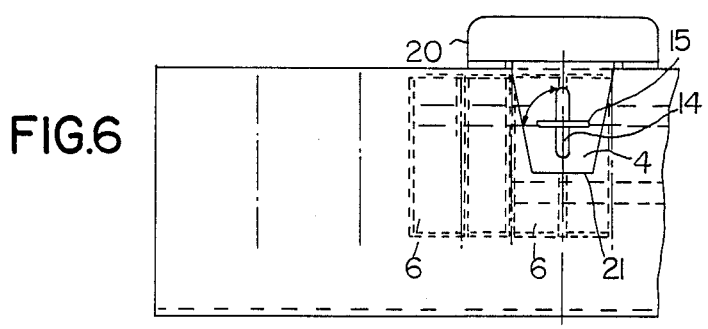
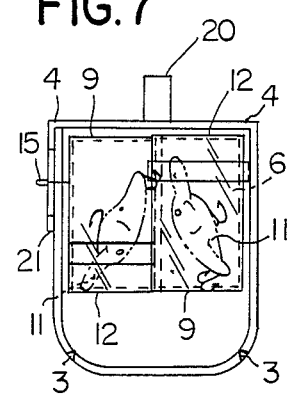

FISHING LURE CONTAINER

This invention relates to a device for housing fishing lures, spoons, plugs and the like and, more specifically, for a device providing easy access and viewing to said items. This application is a continuation in part of Ser. No. 07/220,837 filed in the Patent and Trademark Office July 19, 1988 now U.S. Pat. No. 4,813,173 issued Mar. 21, 1989.

BACKGROUND OF THE INVENTION

The container or tote of this invention is particularly useful in select fishing, that is, knowing what type of fishing the user will be doing and knowing what kind of lures to use and have ready to use. It is known to use various devices for storing items that require easy retrieval. In most fishing lure containers, the lures stored therein become entangled and generally are difficult to retrieve without some degree of obstruction. Also, lures of different sizes become mixed and are not easily segregated one from the other. In addition, there are few devices, if any, where the lure is easily viewed before selection and subsequently conveniently removed.

In parent application Ser. No. 07/220,837 a fishing lure container is described constructed of a transparent case having two distinct compartments positioned one above the other. Each of these compartments contains a single or double circle of transparent tubes. Each tube has an upper open end that forms the exit part for a lure. Planar caps are positioned on each end of the lure container, each cap having apertures that can be aligned with each tube for inserting and removing lures from the apertures. In this parent application, a lure container that is transparent and utilizes tubular housings for the lures is disclosed. In use, this parent application container involves turning the cap until the aperture in the cap is aligned with the entrance of the tube, then the lure is merely taken from the container or the container is turned upside down and the lure removed. In lieu of turning the container upside down, the tube can be removed and the lure taken from it.

The subject of the present application improves upon the device of the parent application in that an easier access is permitted by the present device. Also, the user can merely reach in with fingers to select lure without turning container upside down. In addition, because of its compactness, the container of this invention takes up less space. In all of the prior art discussed in parent application 07/220,837 a variety of containers is disclosed. Each of these prior art containers provided very limited capacity, and relatively difficult retrieval. These prior art multicompartment containers are disclosed in U.S. Pat. Nos. 1,817,562; 2,903,127; 3,358,818; 4,164,301; 4,261,468 and U.S. Pat. No. 4,288,006. None of these prior art containers provided a lure container having a relatively large storage capacity, a container that permits visual observation of the contained lures, and easy immediate access to them.

SUMMARY OF THE INVENTION

It is therefore an object of this invention to provide a lure container that is devoid of the above noted disadvantages.

Another object of this invention is to provide a lure container that is convenient to use, easy to fold and carry and provides a relatively large storage capacity.

Another still further object of this invention is to provide a foldable lure container wherein all of the contained lures are highly visible.

Yet another object of this invention is to provide a lure container where the lures are kept tangle-free from the other lures.

Still another object of this invention is to provide a lure container that is relatively easy and economical to manufacture.

Another yet further object of this invention is to provide a lure container that is spill-proof and that can be easily hung on the side of a boat.

Another object of this invention is to provide a lure container that is extremely thin when in use and does not take much room up in the boat where space is so critical and at a premium.

Another object of this invention is to provide a container that is not kept on seats or floor of boats where the user can trip over and injure himself.

These and other objects are accomplished by providing a foldable lure container having a series of horizontally aligned removable tubes positioned in at least two tiers. These tiers can be of any suitable length and the tubes can be any suitable diameter. This lure container when in use is unfolded and opened so that one series or alignment of tubes are positioned alternatively above the other series of tubes. When the device is to be carried from one location to another, the lower level or series of tubes is folded upward so as to be in horizontal alignment with the upper level or series. Each tube has a flip-open top or cap that permits entrance or exit of the lure housed therein. The tube is removed from the tube holder, inverted, the cap opened and the lure removed. In the preferred embodiment, the bottom of the tube has a spring-loaded hinge which when opened will allow the lure to freely drop out. It also could be a non-springloaded cap that would just snap in place either externally or internally.

A critical feature of this invention is providing a carrier that can be folded in a manner wherein the lower series of tubes when raised will not be aligned with the upper series of tubes. The lower series of tubes are interspersed or fit between adjoining tubes in the upper series when folded up. This arrangement is critical to keeping tubes firmly in place and maximizing space requirements and for allowing ease of transporting or carrying. A closure tab is positioned on the lure container to keep the container in the folded position when closed. This same tab doubles as a hinging means when the container is in the open-unfolded mode.

BRIEF DESCRIPTION OF DRAWING

FIG. 1 is a side plan view of the lure container of this invention in its open mode.

FIG. 2 is a perspective view of the lure container container of this invention as it is hung on the side of a boat.

FIG. 3 is a top plan view of the lure container of this invention its its open mode or position.

FIG. 4 is a front plan view of the lure container of this invention in its open mode or position.

FIG. 5 is a top plan view of the lure container of this invention in its folded or closed mode or position.

FIG. 6 is a front plan view of the lure container of this invention in its folded or closed mode or position.

FIG. 7 is a side plan view of the lure container of this invention in its folded or closed mode or position.

FIG. 8 is a perspective view of the lure container of this invention as it is being folded or closed.

DESCRIPTION OF DRAWING AND PREFERRED EMBODIMENT

In FIG. 1 the lure container 1 of this invention is shown in its open, unfolded mode as it would be hung on a boat side or the like. The container 1 comprises a main panel 2 that can be constructed of plastic, cloth, canvas or other foldable material. In the illustration of FIG. 1, a plastic main panel 2 is shown having fold grooves 3 to permit easy folding of the container 1 when not in use. At the top portion of panel 2 is positioned a closure tab 4 which also is flexible and is used as both (a) closure means to keep the container in the folded position, and (b) as a means to hang the container 1 when in an open or unfolded position. Fixed and attached to panel 2 are holding rings 5 that encircle transparent tubes 6 and hold tubes 6 in place. The tubes 6 can be tapered outwardly at the top or any other suitable means may be used to hold tubes 6 in rings 5 and not permit them to slide down or out of rings 5. An upper tier or series 7 and a lower tier or series 8 of transparent tubes (as shown in FIG. 4) are positioned and fixed to the respective locations on panel 2. Transparent tubes 6 have at their bottom portion a bottom spring-loaded cap 9 that has an extending cap projection 10 that is used to push down, thereby opening the tube to permit the lure 11 to drop out of tube 6 when required. This same bottom cap 9 can be used to insert the lure into tube 6 or optionally a top cap 12 may be provided for tube 6 for inserting lure 11 therein. It is preferred, however, that only a bottom spring loaded cap 9 be used for simplicity and ease of manufacture. Bottom cap 9 and top cap 12 may be made of plastic and molded integral with transparent tube 6, and have a flexible hinge 13 integral therewith. Flexible caps are known and used such as in bottle caps and other flexible closure means used today. The caps 9 and 12 may be manufactured of a clear plastic or transparent material as are tubes 6 or may be made from other flexible materials if desired. It is critical, however, that it be a hinged cap or spring-loaded cap that is easily opened and yet can maintain the lure having a usual weight of 0.2 to 3 ounces in the tube when caps 9 are closed. At the top portion of tab 4 is an aperture 14 which is used with a lock rod 15 (as shown in FIGS. 5, 6, 7 and 8) to maintain lure container 1 in a folded position for carrying, etc. Aperture 14 is also useful for receiving hook or s-shaped hanging means 16 when the container 1 is in the open mode as shown in FIG. 1. In its preferred embodiment, a simple s-shaped hook 16 is used to support and suspend container 1 when in the open mode; however, a suction cup or cups 17 may be used if more convenient. This cup 17 would also fit into aperture 14 for supporting container 1 to a side of a boat or the like.

In FIG. 2, a boat 18 is shown having lure container 1 hung on its boat side 19. Hook 16 merely fits over the side edge of the boat 18 and permits unfolded container 1 with transparent tubes 6 to be easily accessible. Lures 11 are conveniently viewed and easily removed merely by pushing the bottom or lower cap 9 downward, allowing the lure 11 to fall out of tube 6.

In FIG. 3, container 1 is viewed from a top view when container 1 is in the open unfolded mode of FIG. 1. Panel 2 has fixed thereto rings 5; rings 5 hold all removable transparent tubes 6. Tubes 6 are positioned in two tiers or rows, an upper tier 7 and a lower tier 8. These tubes 6 in tier 8 are not positioned immediately below each tube 6 in upper tier 7, but rather are interspersed at intervals overlapping the two tubes immediately above. Tier 8 or lower tubes 6, when container 1 is folded (as shown in FIG. 5), fit snuggly against the inner periphery of two tubes 6 of upper tier 7, thereby conserving space. Cap projects 10 can be seen as they extend outward of each cap 9 and 12. There are more tubes 6 juxtaposed in tier 7 than there are in bottom tier 8, but this can be reversed if desired. The critical feature is that the tubes of tier 8 be interspersed below tier 7 as shown in FIGS. 3 and 4.

In FIG. 4, a front view of container 1 in its open position is shown as it is ready for use. Panel 2 has aligned at its top portion transparent tubes 6 in a top tier 7. Below in tier 8 are tubes 6 not in exact alignment with axis of tubes 6 of tier 7 but rather are positioned obliquely below the tubes 6 of tier 7. This is an important feature of this invention since when folded each tube 6 of lower tier 8 needs to fit between tubes 6 of upper tier 7. This conserves space and at the same time holds all tubes 6 both of tiers 7 and 8 firmly in position abutting each other. Any suitable number of tubes can be positioned in tiers 7 and 8. Rings 5 hold and support each tube 6 in place and tubes 6 can be either or both removable or fixed from and to rings 5. If tubes 6 are fixed to rings 5, spring-loaded caps 9 will permit entrance and exit means for lures 11. If tubes 6 are removable, then either or both a top cap 12 and bottom cap 9 can be used to remove or insert lure 11. Flexible tab 4 is shown with an aperture 14 which will mate with lock rod 15 (as shown in FIG. 6) to hold container 1 in a folded position. This same aperture 14 is used as the means to attach to an s-shaped hook 16 (as shown in FIG. 1) when the container 1 is to be hung on the side of a boat or the like. When plastic is used for the panel 2 material, fold or flex grooves 3 are used to facilitate easy folding of panel 2 as shown in FIGS. 5 and 8. When container 1 is folded, tubes 6 are in the inside of the fold as shown in FIGS. 7 and 8, leaving the outside of panel 2 smooth to prevent any obstructions during transporting container 1. At the same time, tubes 6 remain securely in place abutting each other as in FIG. 7. In the preferred ebmodiment, each tube 6 of both tiers 7 and 8 will have spring-loaded caps 9 at their bottom portions to permit the lure 11 to easily fall out tube 6 when projection 10 is pushed down.

In FIG. 5 a top cutaway view of the lure container in the folded position is illustrated. Tubes 6 of top level or tier 7 can be seen relative to their position to tubes 6 of bottom tier 8 described throughout this disclosure and claims as being "obliquely positioned" or "interspersed". It is clear why this position of each tier 7 and 8 relative to each other is preferred; the space requirements are minimum, the tubes 6 are held tightly together and maximum capacity is provided. Closure tab 4 extends across the width of container 1 and tightly locks container 1 in the folded position as shown. In this position, each tier 7 and 8 are positioned on the same plane with each other; however, the top of tubes 6 of tier 7 are on the same level or plane with the bottoms of the tubes of tier 8 (see FIG. 7). The aperture 14 of tab 4 is mated with locking means or rod 15 to fix tab 4 in position and firmly hold panel 2 in a folded mode.

In FIG. 6, a side view of container 1 in the folded mode is illustrated. Tubes 6 all are aligned on the same level except the bottoms of the tier 8 tubes are facing upward and the bottoms of the tier 7 tubes are facing downward. A handle means 20 extends upwardly for convenient carrying of container 1. Handle means 20 may be a retractable plastic handle, a rope, or any other convenient hand piece. Locking means 15 is clearly shown extending horizontally through aperture 14 of tab 4 to lock container in a folding position or mode.

In FIG. 7, a side view of container 1 in its locked folded position is illustrated. Note that top cap 12 is facing upward in tier 7 while bottom cap 9 is facing upward in tier 8 when in the folded position. Tab 4 wraps around the top portion of container 1 and extends downward at its terminal end 21 whereby it locks onto (via aperture 14) locking rod 15. In lieu of preferred locking rod 15, any other suitable locking means may be used such as Velcro and the like. Flex or fold grooves 3 permit easy bending or folding of panel 2. The position of tiers 7 and 8 are also indicated by the positions of the lures 11 facing up and down in tubes 6.

In FIG. 8, container 1 is illustrated as it is folding just prior to extending tab 4 across it in a locking position. The reversed positioning of tubes 6 in tiers 7 and 8 are also shown. Fold grooves 3 are illustrated as they facilitate folding of panel 2. Tab 4 will extend across to rod 15, passing under handle means 20 when in the locked, folded position.

Any suitable flexible plastics such as acrylates, polycarbonates, polyurethanes, polyvinyl chlorides, polystyrene and mixtures thereof may be used to make the panel of this invention. Any suitable transparent tube 6 material may be used. Each tube must have at least one and preferrably two openings at their terminal portions. The tubes can also be square, hexagonal or any geometric shape. It is preferred, however, that they be round, and can be positioned at any angle other than vertical.

Rather than the preferred fold-up mode, one can use the spirit of this invention with a panel that is rollable rather than foldable. This modification is also included within the scope of this invention. The preferred and optimumly preferred embodiments of the present invention have been described herein and shown in the accompanying drawing to illustrate the underlying principles of the invention, but it is to be understood that numerous modifications and ramifications may be made without departing from the spirit and scope of this invention.

What is claimed is:

1. A lure container having means to facilitate folding, said container comprising a flexible main panel, at least two tiers of transparent tubes, and a panel closure means, said transparent tubes all comprising at least one opened end movably sealed or closed by closure caps, said closure caps being spring loaded in order to facilitate easy removal of a lure therefrom, said tubes having said opened ends to permit insertion and removal of a lure housed within each tube, said tubes when said container is in an open position being obliquely positioned in relation to the tubes in the next adjacent tier of tubes, each of said tubes when said container is in a folded position being interspersed between the tubes positioned in a row above or below it, said panel closure means also having means to suspend said lure container when said lure container is in an open position.

2. The lure container of claim 1 wherein said panel is constructed of a flexible plastic.

3. The lure container of claim 1 wherein said panel is constructed of a flexible cloth.

4. The lure container of claim 1 wherein said panel is constructed of canvas.

5. The lure container of claim 1 wherein said rings encircle each of said transparent tubes and hold each tube in position, said rings and tubes arranged in two tiers one above the other, said rings in a bottom tier interspersed on a vertical axis offset from the vertical axis of the tubes above said bottom tier.

6. The lure container of claim 1 wherein said container when folded presents at least two rows of tubes side by side, each tube of said rows interspersed in relation to each tube in the other row.

7. The lure container of claim 1 wherein said panel is constructed of flexible plastic, said panel having fold grooves therein to facilitate folding of said panel.

8. A foldable lure container comprising in combination a supporting panel, rings fixed to said panel, a closure means attached to said panel, and transparent tubes fitted inside each of said rings, a plurality of said rings positioned side by side on one first level on the surface of said panel, and a plurality of said rings positioned side by side on a second level below said first level, said rings on said second level positioned on a vertical axis offset from and interspersed between the vertical axis of the first level rings, said tubes being closed on at least one end and having a closure cap movably covering a bottom end of each of said tubes; said closure cap spring loaded and being secured and hinged to said transparent tube; said closure cap movable downwardly to open said bottom end and allow a lure to drop therefrom, said closure means having an aperture therein for both closing said lure container and suspending said lure container when said lure container is in a folded, closed mode, and an unfolded, open mode respectively.

9. The lure container of claim 8 wherein said panel is constructed of a flexible plastic.

10. The lure container of claim 8 wherein said panel is constructed of a flexible cloth.

11. The lure container of claim 8 wherein said panel is constructed of canvas.

12. The lure container of claim 8 wherein said rings encircle each of said transparent tubes and hold each tube in position, said rings and tubes arranged in two tiers one above the other, said rings in a bottom tier interspersed on a vertical axis offset from the vertical axis of the tubes above said bottom tier.

13. The lure container of claim 8 wherein said container when folded presents at least two rows of tubes side by side, each tube of said rows interspersed in relation to each tube in the other row.

14. The lure container of claim 8 wherein said panel is constructed of flexible plastic, said panel having fold grooves therein to facilitate folding of said panel.

* * * * *